(12) United States Patent
Pylkkanen et al.

(10) Patent No.: US 10,876,888 B2
(45) Date of Patent: Dec. 29, 2020

(54) PORTABLE ANALYZER USING OPTICAL EMISSION SPECTROSCOPY

(71) Applicant: Hitachi High-Tech Analytical Science Limited, Abingdon (GB)

(72) Inventors: Tuomas Pylkkanen, Helsinki (FI); Esa Raikkonen, Espoo (FI)

(73) Assignee: Hitachi High-Tech Analytical Science Limited, Abingdon (GB)

( * ) Notice: Subject to any disclaimer, the term of this patent is extended or adjusted under 35 U.S.C. 154(b) by 106 days.

(21) Appl. No.: 15/913,199

(22) Filed: Mar. 6, 2018

(65) Prior Publication Data

US 2018/0259393 A1 Sep. 13, 2018

(30) Foreign Application Priority Data

Mar. 10, 2017 (EP) .................................... 17160322

(51) Int. Cl.
| | |
|---|---|
| *G01J 3/02* | (2006.01) |
| *G01J 3/18* | (2006.01) |
| *G01J 3/443* | (2006.01) |
| *G01J 3/28* | (2006.01) |
| *G01J 3/36* | (2006.01) |
| *G01N 21/71* | (2006.01) |

(52) U.S. Cl.
CPC .......... *G01J 3/0208* (2013.01); *G01J 3/0256* (2013.01); *G01J 3/18* (2013.01); *G01J 3/2803* (2013.01); *G01J 3/36* (2013.01); *G01J 3/443* (2013.01); *G01N 21/718* (2013.01)

(58) Field of Classification Search
CPC combination set(s) only.
See application file for complete search history.

(56) References Cited

U.S. PATENT DOCUMENTS 5,026,160 A * 6/1991 Dorain ...................... G01J 3/02
356/328
6,525,875 B1 * 2/2003 Lauer ................... G03H 1/0443
359/368

(Continued)

FOREIGN PATENT DOCUMENTS

| DE | 10 2012 015 584 A1 | 2/2014 |
|---|---|---|
| JP | 51-111375 | 10/1976 |
| WO | WO 02/12950 A1 | 2/2002 |

*Primary Examiner* — Mohamed K Amara
(74) *Attorney, Agent, or Firm* — Harrington & Smith

(57) ABSTRACT

An optical spectrometer arrangement is provided. According to an example, the optical spectrometer arrangement comprises a linear array detector for receiving light at a predefined range of wavelengths, a point detector for receiving light at a predefined wavelength that is outside said predefined range of wavelengths, and an arrangement of a collimating optical element, a diffracting optical element, and a focusing optical element that are arranged to provide at least a first optical path that guides incoming light at said predefined range of wavelengths to the linear array detector via the collimating optical element, the diffracting optical element and the focusing optical element, and a second optical path that guides incoming light at said predefined wavelength to the point detector via the collimating optical element, the diffracting optical element and one of the collimating optical element and the focusing optical element.

15 Claims, 4 Drawing Sheets

(56) References Cited

U.S. PATENT DOCUMENTS

| | | | | |
|---|---|---|---|---|
| 6,862,092 B1* | 3/2005 | Ibsen | G01J 3/00 | 356/328 |
| 6,943,353 B2* | 9/2005 | Elmore | G01J 3/02 | 250/339.02 |
| 7,041,979 B2* | 5/2006 | Chrisp | G01J 3/02 | 250/339.07 |
| 7,239,386 B2* | 7/2007 | Chrisp | G01J 3/18 | 356/328 |
| 7,253,897 B2* | 8/2007 | Moon | G01J 3/02 | 356/308 |
| 7,289,209 B2* | 10/2007 | Kowarz | G01J 3/2823 | 356/330 |
| 7,420,672 B2* | 9/2008 | Wang | G01J 3/02 | 356/301 |
| 7,636,158 B1* | 12/2009 | Pawluczyk | G01J 3/02 | 356/326 |
| 7,684,037 B2* | 3/2010 | Harrison | G01J 3/021 | 356/328 |
| 7,864,317 B2* | 1/2011 | Bockstaele | G01J 3/02 | 356/328 |
| 7,936,455 B2* | 5/2011 | Beardsley | G01J 3/0262 | 356/318 |
| 8,031,336 B2* | 10/2011 | Shibayama | G01J 3/0259 | 356/326 |
| 8,045,155 B2* | 10/2011 | Suzuki | G01J 3/02 | 356/326 |
| 8,045,157 B2* | 10/2011 | Shibayama | G01J 3/02 | 356/328 |
| 8,049,887 B2* | 11/2011 | Suzuki | G01J 3/02 | 356/328 |
| 8,068,223 B2* | 11/2011 | Suzuki | G01J 3/02 | 356/326 |
| 8,068,224 B2* | 11/2011 | Shibayama | G01J 3/02 | 356/328 |
| 8,368,885 B2* | 2/2013 | Shibayama | G01J 3/02 | 356/326 |
| 8,390,806 B1* | 3/2013 | Subramanian | G01J 3/0259 | 356/328 |
| 8,411,268 B2* | 4/2013 | Cook | G01J 3/14 | 250/339.02 |
| 8,564,773 B2* | 10/2013 | Shibayama | G01J 3/02 | 356/326 |
| 8,564,775 B2* | 10/2013 | Wein | G02B 6/2931 | 356/326 |
| 8,604,412 B2* | 12/2013 | Shibayama | G01J 3/02 | 250/226 |
| 8,804,118 B2* | 8/2014 | Shibayama | G01J 3/0297 | 356/328 |
| 8,861,060 B2* | 10/2014 | Puegner | G01J 3/0202 | 359/197.1 |
| 9,222,835 B2* | 12/2015 | Teraoka | G01J 3/36 | |
| 9,435,689 B2* | 9/2016 | Comstock, II | G01J 3/2823 | |
| 9,625,317 B2* | 4/2017 | Correns | G01J 3/18 | |
| 10,060,792 B2* | 8/2018 | Yokino | G01J 3/0291 | |
| 2002/0060792 A1* | 5/2002 | Ibsen | G01J 3/02 | 356/328 |
| 2004/0239931 A1* | 12/2004 | Teichmann | G01J 3/0256 | 356/328 |
| 2005/0175362 A1* | 8/2005 | Wilson | G01J 3/02 | 398/212 |
| 2006/0268269 A1* | 11/2006 | Warren | G01J 3/02 | 356/328 |
| 2007/0019194 A1* | 1/2007 | Chen | G01J 3/02 | 356/328 |
| 2008/0013086 A1* | 1/2008 | Deck | G01J 3/02 | 356/328 |
| 2009/0262346 A1* | 10/2009 | Egloff | G01J 3/02 | 356/326 |
| 2009/0284742 A1* | 11/2009 | Shibayama | G01J 3/0208 | 356/328 |
| 2010/0309454 A1* | 12/2010 | Zhang | G01J 3/02 | 356/39 |
| 2012/0218547 A1* | 8/2012 | Konradi | G02B 21/004 | 356/326 |
| 2012/0307259 A1* | 12/2012 | Leung | G01B 11/24 | 356/603 |
| 2013/0050782 A1* | 2/2013 | Heng | G01N 15/1459 | 358/494 |
| 2013/0141718 A1* | 6/2013 | Yokino | G01J 3/0208 | 356/300 |
| 2013/0204538 A1* | 8/2013 | Rich | G01N 15/14 | 702/21 |
| 2013/0222786 A1* | 8/2013 | Hanson | G01P 5/26 | 356/28 |
| 2013/0235249 A1* | 9/2013 | Shimbo | G01J 3/2803 | 348/335 |
| 2014/0029004 A1* | 1/2014 | Bodkin | G01J 3/02 | 356/328 |
| 2014/0055784 A1* | 2/2014 | Kremer | G01J 3/024 | 356/302 |
| 2014/0055787 A1* | 2/2014 | Teraoka | G01J 3/504 | 356/402 |
| 2014/0226158 A1* | 8/2014 | Trainer | G01J 3/0218 | 356/336 |
| 2014/0268136 A1* | 9/2014 | Pawluczyk | G01J 3/28 | 356/326 |
| 2015/0241277 A1* | 8/2015 | Correns | G01J 3/0259 | 356/305 |
| 2015/0369664 A1* | 12/2015 | Garsha | G01J 3/10 | 356/402 |
| 2015/0371386 A1* | 12/2015 | Zeng | G01N 21/314 | 382/171 |
| 2016/0000422 A1* | 1/2016 | Harrison | A61B 17/00 | 606/144 |
| 2016/0033328 A1* | 2/2016 | Walters | G01J 3/0208 | 356/327 |
| 2016/0042221 A1* | 2/2016 | Mei | G06K 9/00597 | 382/103 |
| 2016/0153766 A1* | 6/2016 | Jones | G01B 9/02098 | 356/511 |
| 2016/0245693 A1* | 8/2016 | Perez Calero | G01J 3/0291 | |
| 2017/0167917 A1* | 6/2017 | Yokino | G01J 3/0291 | |
| 2017/0176251 A1* | 6/2017 | Yokino | G01J 3/0291 | |
| 2017/0184454 A1* | 6/2017 | Nakai | G01J 1/0488 | |
| 2017/0234675 A1* | 8/2017 | Iddan | G01B 9/02004 | 356/479 |
| 2017/0363469 A1* | 12/2017 | Sabry | G01J 3/0208 | |
| 2018/0067053 A1* | 3/2018 | Aizawa | G01J 3/08 | |
| 2018/0224330 A1* | 8/2018 | Yokino | G01J 3/18 | |
| 2018/0374889 A1* | 12/2018 | Cao | H01L 27/14609 | |
| 2019/0271652 A1* | 9/2019 | Zhao | G01N 33/24 | |

* cited by examiner

PORTABLE ANALYZER USING OPTICAL EMISSION SPECTROSCOPY

TECHNICAL FIELD

The present invention relates to a portable analyzer device for analysis of sample composition based on optical emission spectroscopy. In particular, embodiments of the present invention relate to providing such a portable analyzer that is small in size but yet enables analysis that considers wavelengths of interest spanning over a wide range.

BACKGROUND

Handheld or otherwise portable analyzer devices are frequently used in the field e.g. for recognizing and sorting objects according to material(s) they contain. As a few examples, a portable analyzer device may be used in places like scrapyards, dumping grounds and recycling centers. While several techniques for analyzing a sample under study are available, optical emission spectroscopy is widely employed in portable analyzer devices to determine elemental composition of the sample under study. Such analyzer devices may be referred to as optical analyzers. An optical analyzer typically includes an excitation means for invoking an optical emission from a surface of a sample under study, a detector means for capturing signals that are descriptive of the optical emission and an analysis means for determination of the elemental composition of the sample under study on the basis of the captured signals.

A well-known example of such an optical analyzer employs laser-induced breakdown spectroscopy (LIBS) and may be referred to as a LIBS analyzer. A LIBS analyzer comprises, as the excitation means, a laser that is arranged to generate a high peak power laser pulse. The laser pulse is focused to the sample under study to form a plasma plume on a surface of the sample in order to cause atomization and excitation on the surface. This causes light emission at wavelength(s) that are characteristic to elements on the surface of the sample. The light emission is received at the detector means, which then carries out an analysis based on the received optical emission from the sample to determine the elemental composition of the sample. Since all elements emit light that exhibit wavelength(s) characteristic thereto, the relative intensities of different wavelengths in the light received at the detector means reveal the elemental constitution of the sample.

A dominant design of the detector means in a LIBS analyser, or in any optical analyser designed for use in a portable or a handheld analyser device, makes use of a Czerny-Turner spectrometer known in the art. In a Czerny-Turner spectrometer the received light emission is transferred to an array detector via an optical path that involves a dispersing optical element. FIG. 1 schematically illustrates an example of an optical spectrometer arrangement 100 that implements a symmetrical Czerny-Turner spectrometer. The optical spectrometer arrangement 100 is shown with an entrance slit 102, a collimating mirror 104, a diffraction grating 106, a focusing mirror 108 and a linear array detector 110. In operation, the light entering via the entrance slit 102 hits the collimating mirror 104, where the entrance slit 102 is arranged at the focus distance of the collimating mirror 104. Collimated light is reflected from the collimating mirror 104 to the diffraction grating 106. The diffracted light from the diffraction grating 106 hits the focusing mirror 108, from which the diffracted light is reflected to the linear array detector 110, where the position at which the light meets a light-sensitive surface of the linear array detector 110 is dependent on the wavelength of light. The linear array detector 110, which is typically provided as a charge-coupled device (CCD), records one or more signals that represent relative light intensities at different wavelengths, and these one or more signals are provided for analysis to identify the element(s) that match the recorded combination of relative light intensities. The route of the received light from the entrance slit 102 to the linear array detector 110 may be referred to as an optical path of the optical spectrometer arrangement 100.

Characteristics and relative positions of optical components of the optical spectrometer arrangement 100, i.e. the entrance slit 102, the collimating mirror 104, the diffraction grating 106, the focusing mirror 108 and the linear array detector 110, define the range of wavelengths and their resolution received at the linear array detector 110, thereby defining the wavelength range and resolution available for analysis in a device making use of the optical spectrometer arrangement 100. Typically, the spectrometer design is a trade-off between several aspects, including detection performance (wavelength range, wavelength resolution), physical size of the optical spectrometer arrangement 100 and manufacturing costs.

In terms of detection performance, the choice of the diffraction grating 106 and the linear array detector 110 has a major impact on the detectable range of wavelengths and wavelength resolution: assuming that the array detector 110 has a fixed size, choosing a diffraction grating 106 with a low groove density results in a wide range of detectable wavelengths with a low wavelength resolution at the linear array detector 110;

choosing a diffraction grating 106 with a high groove density results in a narrow range of detectable wavelengths with a high wavelength resolution at the linear array detector 110.

On the other hand, if assuming fixed groove density in the diffraction grating 106, increasing the range of detectable wavelengths requires increasing size of the linear array detector 110, while going for a linear array detector 110 of smaller size results in decreased range of detectable wavelengths. The range of wavelengths detectable by the optical spectrometer arrangement 100 may be denoted by a minimum wavelength $\lambda_{min}$ and a maximum wavelength $\lambda_{max}$ that serve as respective end-points of the range.

In many scenarios, designing the optical spectrometer arrangement 100 to enable detection of a sufficient range of wavelengths at a sufficient wavelength resolution requires usage of a linear array detector 110 having a physical size that exceeds design requirements in this regard, which may be an important aspect especially when designing an optical spectrometer arrangement for a portable and/or handheld analyser device where as small size as possible is preferred since it makes the handling of the analyser device more convenient for the user and also to enables using the analyser device in narrow spaces when required.

In some cases the size issue could be at least partially addressed by employing multiple (smaller-size) optical spectrometer arrangements 100 in parallel, each arranged to detect signals at a respective range of wavelengths. However, in many cases this approach may not address the size issue to a sufficient extent or it may even be unfeasible, while in any case it results in significantly increased manufacturing costs of the analyser device.

SUMMARY

It is therefore an object of the present invention to provide an optical spectrometer arrangement that enables good detection performance with respect to wavelengths of interest that span a wide range of wavelengths but that yet enables small physical size, thereby making the optical spectrometer arrangement suitable for use also in a portable analyzer device that is small in size.

In the following, a simplified summary of some embodiments of the present invention is provided in order to facilitate a basic understanding of the disclosed technique. The summary is, however, not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

According to an example embodiment, an optical spectrometer arrangement is provided, the optical spectrometer arrangement comprising a linear array detector for receiving light at a predefined range of wavelengths; a point detector for receiving light at a predefined wavelength that is outside said predefined range of wavelengths; and an arrangement of a collimating optical element, a diffracting optical element, and a focusing optical element that are arranged to provide at least a first optical path that guides incoming light at said predefined range of wavelengths to the linear array detector via the collimating optical element, the diffracting optical element and the focusing optical element, and a second optical path that guides incoming light at said predefined wavelength to the point detector via the collimating optical element, the diffracting optical element and one of the collimating optical element and the focusing optical element.

In an example the diffracting optical element is arranged with respect to the collimating optical element and the focusing optical element such that light at said predefined range of wavelengths is forward diffracted from the diffracting optical element towards the focusing optical element, the first optical path thereby guiding incoming light at said predefined range of wavelengths to the linear array detector via the collimating optical element, the diffracting optical element and the focusing optical element, and light at said predefined wavelength is forward diffracted from the diffracting optical element towards the focusing optical element, the second optical path thereby guiding incoming light at said predefined wavelength to the point detector via the collimating optical element, the diffracting optical element and the focusing optical element.

In another example, the diffracting optical element is arranged with respect to the collimating optical element and the focusing optical element such that light at said predefined range of wavelengths is forward diffracted from the diffracting optical element towards the focusing optical element, the first optical path thereby guiding incoming light at said predefined range of wavelengths to the linear array detector via the collimating optical element, the diffracting optical element and the focusing optical element, and light at said predefined wavelength is back diffracted from the diffracting optical element towards the collimating optical element, the second optical path thereby guiding incoming light at said predefined wavelength to the point detector via the collimating optical element, the diffracting optical element and the collimating optical element, wherein the collimating optical element also serves as the focusing optical element for light at said predefined wavelength.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF DRAWINGS

In the accompanying drawings.

DETAILED DESCRIPTION

Figure 2:
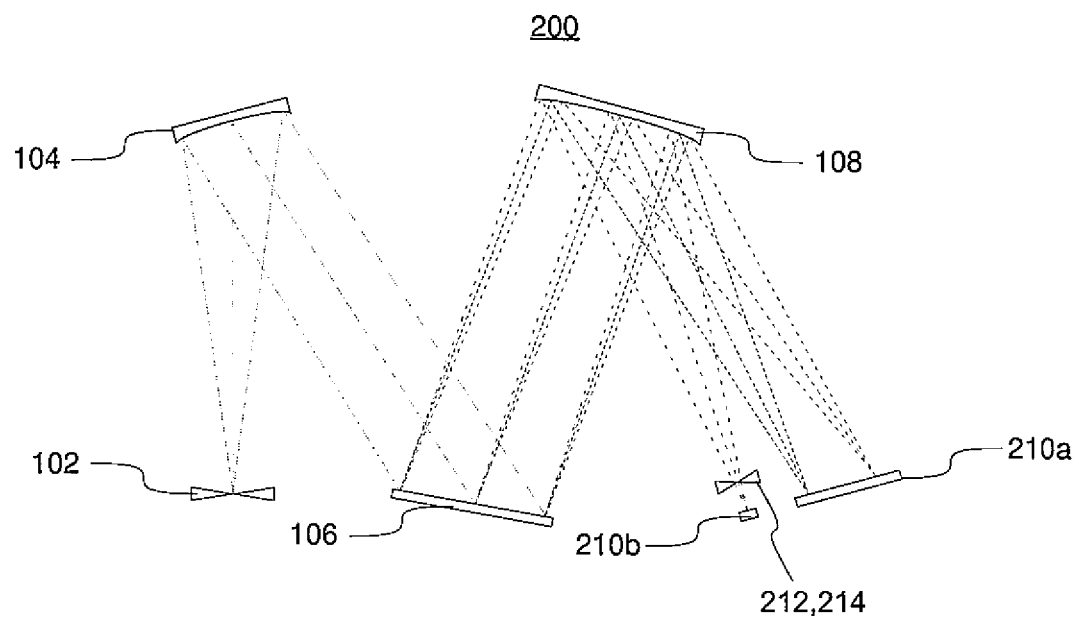
FIG. 2 schematically illustrates an improved optical spectrometer arrangement for a Czerny-Turner spectrometer according to an example.

FIG. 2 schematically illustrates an example of an optical spectrometer arrangement 200 that implements a symmetrical Czerny-Turner spectrometer. The optical spectrometer arrangement 200 shares some components with the optical spectrometer arrangement 100 described in the foregoing, while the differences to the optical spectrometer arrangement 100 enable detection of desired wavelengths within a wide range of wavelengths while enabling provision of the optical spectrometer arrangement 200 in a smaller physical size and/or at improved detection performance. This, in turn, for example allows making an analyser device that makes use of the optical spectrometer arrangement 200 smaller in size without compromising the detection performance.

Like the optical spectrometer arrangement 100, also the optical spectrometer arrangement 200 is shown with the entrance slit 102, the collimating mirror 104, the diffraction grating 106 and the focusing mirror 108, which may be similar or even identical to the corresponding components of the optical spectrometer arrangement 100. The optical spectrometer arrangement further comprises a linear array detector 210a and a point detector 210b. In operation, along the lines described for the optical spectrometer arrangement 100 in the foregoing, the light entering via the entrance slit 102 hits the collimating mirror 104, where the entrance slit 102 is arranged at the focus distance of the collimating mirror 104. Collimated light is reflected from the collimating mirror 104 to the diffraction grating 106. Forward diffracted light from the diffraction grating 106 hits the focusing mirror 108, from which the forward diffracted light is reflected to the linear array detector 210a and to the point detector 210b. The route of the received light from the entrance slit 102 to the linear array detector 210a may be referred to as a first optical path of the optical spectrometer arrangement 200, whereas the route of the received light from the entrance slit 102 to the point detector 210b may be referred to as a second optical path of the optical spectrometer arrangement 200.

Note that while the example of FIG. 2 depicts the optical spectrometer arrangement 200 with the collimating mirror 104 and the focusing mirror 108, in a different design the collimating mirror 104 may be replaced e.g. with a collimating lens, the diffraction grating 106 may be replaced e.g. with a dispersive prism and/or the focusing mirror 108 may be replaced e.g. with a focusing lens. Hence, the example depicted in FIG. 2 serves as an example of a more general design, where the collimating mirror 104 represents a collimating optical element, the diffraction grating 106 represents a diffracting optical element and the focusing mirror 108 represents a focusing optical element. In the following, however, for clarity and brevity of description, references are made to the collimating mirror 104, the diffraction grating 106 and the focusing mirror 108 depicted in exemplifying design depicted in FIG. 2, while the description readily generalizes into an approach that involves, respectively, the collimating optical element, the diffracting optical element and the focusing optical element.

The optical spectrometer arrangement 200 is designed to detect light at wavelengths of interest within the overall range of wavelengths from $\lambda_{min}$ to $\lambda_{max}$ such that the linear array detector 210a serves to detect light at wavelengths within a predefined first range from a minimum wavelength $\lambda_{1,min}$ to a maximum wavelength $\lambda_{1,max}$, whereas the point detector 210b serves to detect light at a predefined second wavelength $\lambda_2$. Herein, the predefined second wavelength $\lambda_2$ is outside the predefined first range defined by its end-points $\lambda_{1,min}$ and $\lambda_{1,max}$, whereas both the first range from $\lambda_{1,min}$ to $\lambda_{1,max}$ and the second wavelength $\lambda_2$ are within the overall range from $\lambda_{min}$ to $\lambda_{max}$. The usage of the point detector 210b may be considered to extend the range of detectable frequencies from the first range from $\lambda_{1,min}$ to $\lambda_{1,max}$ to cover also the second wavelength $\lambda_2$.

Figure 3:
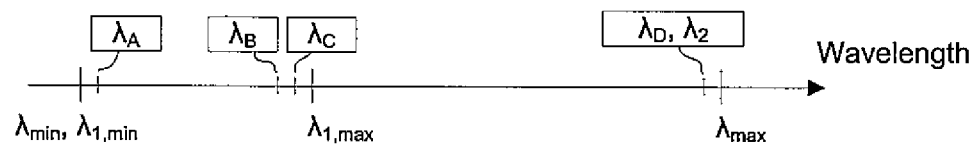
FIG. 3 illustrates an example of a relationship between wavelengths of interest and wavelengths detectable by detector elements of optical spectrometer arrangements.

FIG. 3 depicts an illustrative example of the first range from $\lambda_{1,min}$ to $\lambda_{1,max}$ and the second wavelength $\lambda_2$ in view of the overall range from $\lambda_{min}$ to $\lambda_{max}$ and further in view of four exemplifying wavelengths of interest $\lambda_A$, $\lambda_B$, $\lambda_C$ and $\lambda_D$ that are within the overall range from $\lambda_{min}$ to $\lambda_{max}$. As illustrated in FIG. 3, in this example the wavelengths $\lambda_A$, $\lambda_B$ and $\lambda_C$ are within the first range with the wavelengths $\lambda_B$ and $\lambda_C$ relatively close to each other, whereas the second wavelength $\lambda_2$ is set at the wavelength $\lambda_D$. Some of the examples described in the following refer back to this example while describing some advantages of the optical spectrometer arrangement 200 over the previously known solutions.

The linear array detector 210a and the point detector 210b are positioned with respect to each other and with respect to other components of the optical spectrometer arrangement 200 such that the light at wavelengths from $\lambda_{1,min}$ to $\lambda_{1,max}$ (i.e. wavelengths that are within the predefined first range) travels along the first optical path to the linear array detector 210a whereas light at wavelength $\lambda_2$ (i.e. the predefined second wavelength that is outside the first range) travels along the second optical path to the point detector 210b. Consequently, light at wavelengths from $\lambda_{1,min}$ to $\lambda_{1,max}$ are received at the linear array detector 210a and the light at wavelength $\lambda_2$ is received at the point detector 210b. Moreover, the position at which the light at a wavelength between $\lambda_{1,min}$ to $\lambda_{1,max}$ meets the linear array detector 210a depends on the wavelength according to a monotonic function. On the other hand, light at a wavelength outside the range from $\lambda_{1,min}$ to $\lambda_{1,max}$ and that is not at wavelength $\lambda_2$ is not received by the either of the linear array detector 210a and the point detector 210b.

The linear array detector 210a serves to record one or more first detection signals that represent relative light intensities at different wavelengths within the predetermined first range from $\lambda_{1,min}$ to $\lambda_{1,max}$, whereas the point detector 210b serves to record a second detection signal that represents relative light intensity at the predefined second wavelength $\lambda_2$. The first and second detection signals are useable for an analysis to identify the element(s) that match the combination of relative light intensities indicated by the recorded first and second detection signals.

In the example depicted in FIG. 2 the point detector 210b serves to extend the detectable wavelengths with the second wavelength $\lambda_2$ that is higher than the first range of wavelengths from $\lambda_{1,min}$ to $\lambda_{1,max}$ (i.e. the second wavelength $\lambda_2$ is higher than the upper limit of the first range $\lambda_{1,max}$). In a variation of the example of FIG. 2 the point detector 210b may be arranged on the opposite side of the linear array detector 210a (i.e. in the right side thereof in the illustration), thereby resulting in an optical spectrometer arrangement 200 where the second wavelength $\lambda_2$ is lower than the first range of wavelengths from $\lambda_{1,min}$ to $\lambda_{1,max}$ (i.e. the second wavelength $\lambda_2$ is lower than the lower limit of the first range $\lambda_{1,min}$).

The linear array detector 210a and the point detector 210b are arranged with respect to each other such that their light-detecting surfaces are on the same or substantially the same plane facing the focusing mirror 108 to ensure correct focus of the light reflected therefrom along the first and second optical paths, respectively, at their light-detecting surfaces. The physical distance between the linear array detector 210a and the point detector 210b is set in dependence of the first range of wavelengths $\lambda_{1,min}$ to $\lambda_{1,max}$ and the second wavelength $\lambda_2$. A suitable position of the point detector 210b with respect to the linear array detector 210a may be defined e.g. by arranging the entrance slit 102, the collimating mirror 104, the diffraction grating 106, the focusing mirror 108 and the linear array detector 210a in their respective (physical) positions in the optical spectrometer arrangement 200 and calibrating the arrangement 200 using procedures known in the art such that the linear array detector 210a provides desired detection performance (e.g. with respect wavelength resolution, detection sensitivity and/or signal-to-noise ratio (SNR)) in view of the first range of wavelengths, after which a dedicated light source. e.g. a diode laser emitting light at the second wavelength $\lambda_2$, may be employed to emit light along the second optical path to provide a positioning reference for the point detector 210b within the optical spectrometer arrangement 200.

The optical spectrometer arrangement 200 may optionally further include a slit or a mask 212 in front of the point detector 210b such that the light entering the point detector 210b along the second optical path travels through the slit or the mask 212. The slit or the mask 212 serves to improve the wavelength resolution of the point detector 210b by limiting the range of (spatially dispersed) wavelengths incident of the point detector 210b such that only desired predefined wavelengths are able to reach the point detector 210b.

Alternatively or additionally, the optical spectrometer arrangement 200 may, optionally, further include an order-sorting filter 214 in front of the point detector 210b such that the light entering the point detector 210b along the second optical path travels through the order-sorting filter 214. The order-sorting filter 214 absorbs light below a predetermined wavelength and serves to reduce or avoid interference caused by higher diffraction orders of light at lower wavelengths.

While FIG. 2 schematically illustrates an example of an optical spectrometer arrangement 200 that implements a symmetrical Czerny-Turner spectrometer, the aspect of using a combination of the linear array detector 210a and the point detector 210b is equally applicable for other spectrometer designs, such as a crossed Czerny-Turner spectrometer, a transmission grating spectrometer, a flat-field grating spectrometer, etc.

Figure 4:
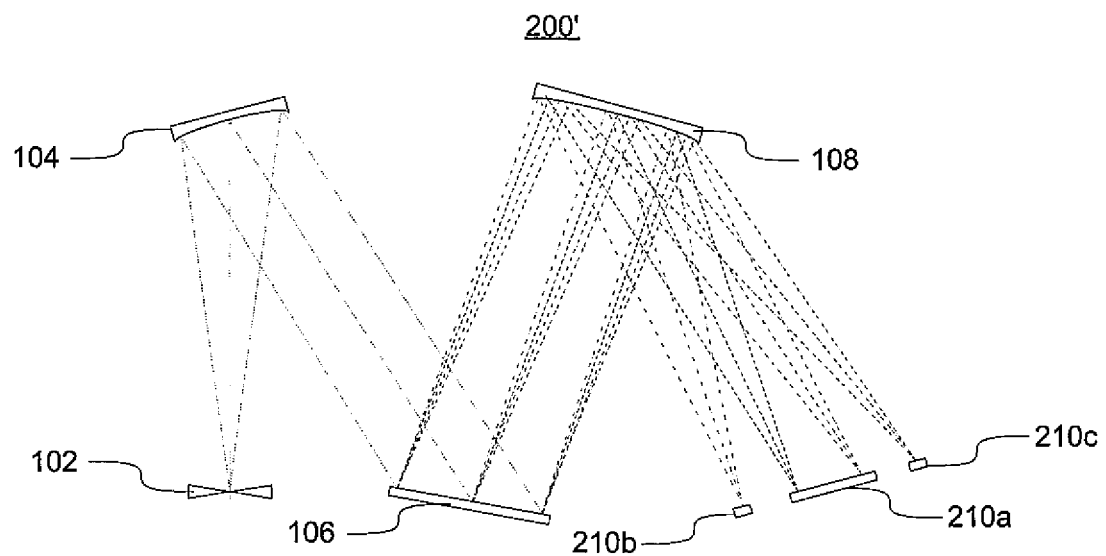
FIG. 4 schematically illustrates an improved optical spectrometer arrangement for a Czerny-Turner spectrometer according to another example.

While FIG. 2 schematically illustrates an example of an optical spectrometer arrangement 200 that includes the combination of the linear array detector 210a and the point detector 210b, in other examples the optical spectrometer arrangement 200 may be modifies such that it is provided with the linear array detector 210a together with two or more point detectors, each arranged to detect light at a respective predefined second wavelength. As a non-limiting example in this regard, FIG. 4 schematically illustrates an optical spectrometer arrangement 200' that is provided with the point detector 210b and a further point detector 210c, such that the two point detectors 210b and 210c are arranged in the same or substantially the same plane with the linear array detector 210a at opposite sides thereof. The optical spectrometer arrangement 200' is designed to detect light at wavelengths of interest within the overall range of wavelengths from $\lambda_{min}$ to $\lambda_{max}$ such that the linear array detector 210a serves to detect light at wavelengths within the predefined first range from the minimum wavelength $\lambda_{1,min}$ to the maximum wavelength $\lambda_{1,max}$, the point detector 210b serves to detect light at the predefined second wavelength $\lambda_2$ and the further point detector 210c serves to detect light at a predefined third wavelength $\lambda_3$. Herein, the predefined second wavelength $\lambda_2$ and the predefined third wavelength $\lambda_3$ are outside the predefined first range such that the second wavelength $\lambda_2$ is higher than the upper limit of the first range $\lambda_{1,max}$ and the third wavelength $\lambda_3$ is lower than the lower limit of the first range $\lambda_{1,min}$, whereas both the first range from $\lambda_{1,min}$ to $\lambda_{1,max}$, the second wavelength $\lambda_2$ and the third wavelength $\lambda_3$ are within the overall range from $\lambda_{min}$ to $\lambda_{max}$.

Along the lines described for the example of FIG. 2, the linear array detector 210a and the point detectors 210b, 210c are positioned with respect to each other and with respect to other components of the optical spectrometer arrangement 200' such that the light at wavelengths from $\lambda_{1,min}$ to $\lambda_{1,max}$ (i.e. wavelengths that are within the predefined first range) travels along the first optical path to the linear array detector 210a whereas light at the second wavelength $\lambda_2$ travels along the second optical path to the point detector 210b and light at the third wavelength $\lambda_3$ travels along a third optical path (a route of the received light from the entrance slit 102 to the further point detector 210c) to the further point detector 210c.

Further along the lines described for the example of FIG. 2, the linear array detector 210a serves to record one or more first detection signals that represent relative light intensities at different wavelengths within the predetermined first range from $\lambda_{1,min}$ to $\lambda_{1,max}$, the point detector 210b serves to record a second detection signal that represents relative light intensity at the second wavelength $\lambda_2$, whereas the further point detector 210c serves to record a third detection signal that represents relative light intensity at the third wavelength $\lambda_3$. The first, second and third detection signals are useable for an analysis to identify the element(s) that match the combination of relative light intensities indicated by the recorded first, second and third detection signals.

Figure 5:
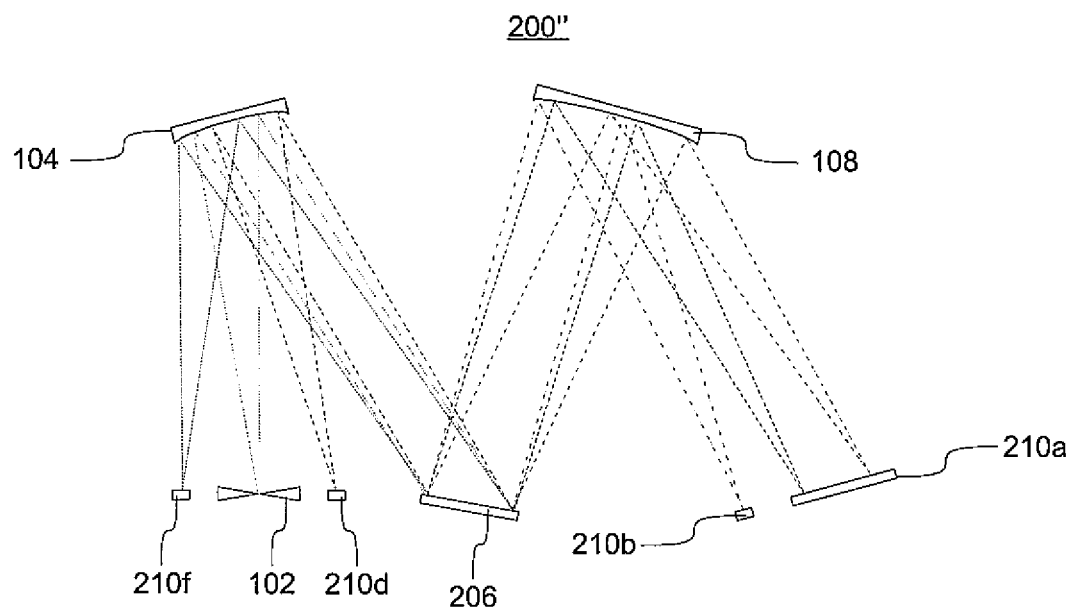
FIG. 5 schematically illustrates an improved optical spectrometer arrangement for a Czerny-Turner spectrometer according to a further example.

FIG. 5 schematically illustrates a further example of an optical spectrometer arrangement 200" that implements a symmetrical Czerny-Turner spectrometer. The optical spectrometer arrangement 200" uses diffracted light rays that are directed from the diffracting optical element (represented in FIG. 5 by a diffraction grating 206) either towards the focusing optical element (represented in FIG. 5 by the focusing mirror 108) or back towards the collimating optical element (represented in FIG. 5 by the collimating mirror 104). The light rays directed towards the focusing optical element are denoted as forward diffracted light (rays) and the light rays directed back towards the collimating optical element are denoted as back diffracted light (rays). The utilization of both forward and back diffracted light, possibly of the same diffraction order, allows spanning an even wider range of wavelengths or making the optical spectrometer arrangement 200" even more compact in size.

In addition to the entrance slit 102, the collimating mirror 104, the diffraction grating 206 and the focusing mirror 108, the optical spectrometer arrangement 200" further comprises the linear array detector 210a, the point detector 210b and further point detectors 210d and 210f. The linear array detector 210a and the point detector 210b are arranged to receive the forward diffracted light and their arrangement and positioning (with respect to each other and with respect to other elements of the optical spectrometer arrangement 200") is similar to that described in context of the example of FIG. 2, whereas the further point detectors 210d and 210f are arranged at the same or substantially the same plane for reception of back diffracted light from the collimating mirror 102. Hence, in the optical spectrometer arrangement 200" the collimating mirror 104 also serves as a (second) focusing optical element for the back diffracted light.

The optical spectrometer arrangement 200" is designed to detect light at wavelengths of interest within the overall range of wavelengths from $\lambda_{min}$ to $\lambda_{max}$ such that the linear array detector 210a serves to detect light at wavelengths within the predefined first range from the minimum wavelength $\lambda_{1,min}$ to the maximum wavelength $\lambda_{1,max}$, the point detector 210b serves to detect light at the predefined second wavelength $\lambda_2$, the further point detector 210d serves to detect light at a predefined fourth wavelength $\lambda_4$, and the further point detector 210f serves to detect light at a predefined fifth wavelength $\lambda_5$. Herein, the second wavelength $\lambda_2$, the fourth wavelength $\lambda_4$ and the fifth wavelength $\lambda_5$ are outside the predefined first range such that they are all higher than the upper limit of the first range $\lambda_{1,max}$ such that $\lambda_5 > \lambda_4 > \lambda_2$.

Along the lines described for the examples of FIGS. 2 and 4, the linear array detector 210a and the point detectors 210b, 210d, 210f are positioned with respect to each other and with respect to other components of the optical spectrometer arrangement 200" such that the light at wavelengths from $\lambda_{1,min}$ to $\lambda_{1,max}$ (i.e. wavelengths that are within the predefined first range) travels along the first optical path to the linear array detector 210a, light at the second wavelength $\lambda_2$ travels along the second optical path to the point detector 210b, light at the fourth wavelength $\lambda_4$ travels along a fourth optical path (i.e. a route of the back diffracted light from the entrance slit 102 to the point detector 210d) to the point detector 210d and light at the fifth wavelength $\lambda_5$ travels along a fifth optical path (a route of the back diffracted light from the entrance slit 102 to the point detector 210f) to the point detector 210f.

Further along the lines described for the examples of FIGS. 2 and 4, the linear array detector 210a serves to record one or more first detection signals that represent relative light intensities at different wavelengths within the predetermined first range from $\lambda_{1,min}$ to $\lambda_{1,max}$, the point detector 210b serves to record a second detection signal that represents relative light intensity at the second wavelength $\lambda_2$, whereas the further point detectors 210d and 210f respectively serve to record a fourth and fifth detection signals that represents relative light intensity at the respective fourth and fifth wavelengths $\lambda_4$ and $\lambda_5$. The first, second, fourth and fifth detection signals are useable for an analysis to identify the element(s) that match the combination of relative light intensities indicated by the recorded first, second, fourth and fifth detection signals.

While the optical spectrometer arrangement 200" is described in the foregoing as a variation of the optical spectrometer arrangement 200, in another example the optical spectrometer arrangement 200" may be alternatively provided as a respective variation of the optical spectrometer arrangement 200' that includes also the further point detector 210c for detection of light at the third wavelength $\lambda_3$. In a further example, the optical spectrometer arrangement 200" may be provided without the further point detector 210b, thereby providing an optical spectrometer arrangement where all forward diffracted light at wavelengths of interest (e.g. the first range from $\lambda_{1,min}$ to $\lambda_{1,max}$) is received at the linear array detector 210a while the back diffracted light at one or more wavelengths of interest (e.g. the fourth wavelength $\lambda_4$ and/or the fifth wavelength $\lambda_5$) are received at respective point detectors 210d and/or 210f.

In an example, the linear array detector 210a is provided as a CCD, whereas in other examples the linear array detector 210a may be provided, for example, as a complementary metal-oxide-semiconductor (CMOS) sensor, or, in general, as any (silicon-based) solid state sensor.

In an example, the point detector 210b, 210c, 210d, 210f is provided as a photodiode, whereas in other examples the point detector 210b, 210c, 210d, 210f may be provided, for example, as a photomultiplier tube, as an avalanche photodiode (APD) or as a single-photon avalanche diode (SPAD). As a further example, the point detector 210b, 210c, 210d, 210b can be composed of multiple (sub)pixels while essentially acting as a point detector.

While the description in the foregoing refers to light at different wavelengths, a certain wavelength or a certain sub-range of wavelengths may be referred to as a channel. Hence, using this alterative terminology, the linear array detector 210a may serve to receive light at a plurality of adjacent channels (e.g. a plurality of first channels) that jointly cover the first range of wavelengths, whereas the point detector 210b, 210c, 210d, 210f may serve to receive light at a single channel (e.g. a single second, third, fourth, fifth channel) that is non-adjacent to channels of the first range. Moreover, due to the well-known relationship between wavelengths and corresponding frequencies, a wavelength or a channel may be alternatively referred to as a spectral line. In the following, any combination of the second wavelength $\lambda_2$, the third wavelength $\lambda_3$, the fourth wavelength $\lambda_4$ and/or the fifth wavelength $\lambda_5$ is referred to as one or more non-adjacent wavelengths.

Figure 1:
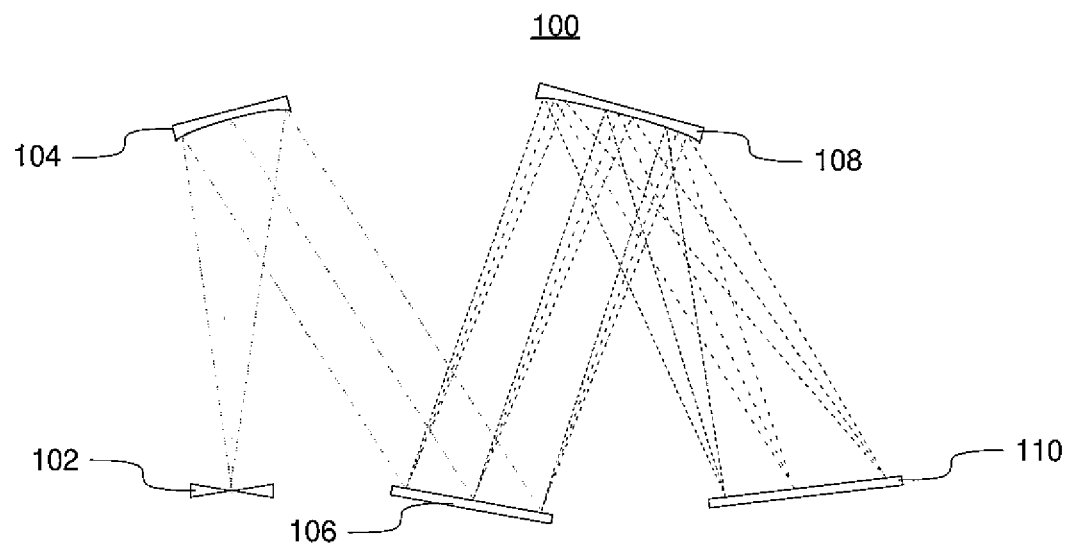
FIG. 1 schematically illustrates an optical spectrometer arrangement for a Czerny-Turner spectrometer.

Providing one or more point detectors 210b, 210c, 210d, 210f for detection of light at the respective wavelength $\lambda_2$, $\lambda_3$, $\lambda_4$, $\lambda_5$ separately from detection of the light within the first range of wavelengths from $\lambda_{1,min}$ to $\lambda_{1,max}$ by the linear array detector 210a enables several benefits over previously known solutions, e.g. the one according to FIG. 1 that makes use of the (large) single array detector 110 that covers a continuous range of wavelengths from $\lambda_{min}$ to $\lambda_{max}$.

One advantage of the optical spectrometer arrangement 200, 200', 200" over the optical spectrometer arrangement 100 is that it enables accommodating components of the optical spectrometer arrangement in a smaller physical space. While this advantage is basically available for any combination of the first range of wavelengths from $\lambda_{1,min}$ to $\lambda_{1,max}$ and one or more non-adjacent wavelengths, this advantage may be especially pronounced in a scenario where the one or more non-adjacent wavelengths are relatively far from the first range of wavelengths from $\lambda_{1,min}$ to $\lambda_{1,max}$. In the following, for clarity and brevity of description, the optical spectrometer arrangement 200 is used as an example for describing some benefits of the optical spectrometer arrangements according to the present disclosure. However, these benefits are equally applicable also e.g. to the optical spectrometer arrangements 200' and 200".

In a scenario where the wavelengths of interest include the first range of wavelengths from $\lambda_{1,min}$ to $\lambda_{1,max}$ and the second wavelength $\lambda_2$ that both fall within the overall range of wavelengths from $\lambda_{min}$ to $\lambda_{max}$, relatively large part of the (large) single array detector 110 would be covering wavelengths between $\lambda_{1,max}$ and $\lambda_2$ that are of no interest, whereas the arrangement of the linear array detector 210a and the point detector 210b may be employed to concentrate the detection primarily on wavelengths of interest (from $\lambda_{1,min}$ to $\lambda_{1,max}$ and at $\lambda_2$) while ignoring a range of wavelengths of no interest between the second wavelength and the first range (e.g. between $\lambda_{1,max}$ and $\lambda_2$).

Referring back to the illustration of FIG. 3 and assuming the wavelengths $\lambda_A$, $\lambda_B$, $\lambda_C$ and $\lambda_D$ to represent the wavelengths of interest, one can readily see that the linear array detector 210a can be designed to have less than half the size of the linear array detector 100 for the same wavelength resolution while still enabling substantially equal detection performance in consideration of wavelengths of interest. This enables savings in overall size of the optical spectrometer arrangement 200, 200', 200" due to smaller-sized linear array detector 210a and also savings in cost since the smaller-sized linear array detector 210a is typically less expensive than a larger one (at a comparable quality) while the additional cost arising from the usage of the point detector 210b is typically negligible in comparison. On the other hand, if comparing to an approach that makes use of multiple optical spectrometer arrangements that each cover a different sub-range to jointly cover the overall range from $\lambda_{min}$ to $\lambda_{max}$, the advantage arising from usage of the optical spectrometer arrangement 200, 200', 200" in terms of (smaller) size and (lower) manufacturing cost is significant.

Another advantage of the optical spectrometer arrangement 200, 200', 200" over the optical spectrometer arrangement 100 is the possibility to separately optimize the detection performance of each of the detectors 210a, 210b, 210c, 210d, 210f with respect to their sensitivity. This is beneficial since the expected amount of light at different wavelengths of interest (e.g. $\lambda_A$, $\lambda_B$, $\lambda_C$ and $\lambda_D$ in the example of FIG. 3) may be different and in such a scenario designing the linear array detector 210a and e.g. the point detector 210b to operate at different sensitivities enables improved detection performance.

In this regard, the first and second detection signals from the linear array detector 210a and the point detector 210b are recorded or collected by exposing the detector 210a, 210b to incoming light for a respective collection period $T_a$, $T_b$. Conversely, the respective first or second detection signal can be provided or read from the detector 210a, 210b at intervals defined by the respective collection period $T_a$, $T_b$. Especially for handheld analyser device the (temporal) length of the collection period $T_a$, $T_b$ is limited.

The collection period $T_a$ further consists of $n_a$ integration periods $T_{a,i}$. If ignoring the practically negligible period of time spent for providing or reading the first detection signal(s) from the linear array detector 210a, it may be reasonably assumed that $T_a$ substantially equals $n_a \times T_{a,i}$ (i.e. $T_a = n_a \times T_{a,i}$). In practice, the first detection signal(s) always include some level of noise, which is typically dominated by the readout noise and is therefore dependent on the number of integration periods $n_a$ with the collection period $T_a$: a lower number of integration periods $n_a$ results in less noise but requires longer integration periods $T_{a,i}$. Conversely, the highest possible signal amplitude that can be measured without saturation (i.e. the maximum light level at a certain wavelength the first measurement signal is able to indicate) is directly determined by the integration period $T_{a,i}$: a shorter integration period $T_{a,i}$ allows higher light levels to be detected without saturation but on the other hand it increases the noise level via a higher number of integration periods $n_a$ within the collection period $T_a$. Along similar lines, the collection period $T_b$, further consists of $n_b$ integration periods $T_{b,i}$, such that $T_b$ substantially equals $n_b \times T_{b,i}$ (i.e. $T_b = n_b \times T_{b,i}$), whereas the above noise considerations concerning selection of the number of integration periods $n_b$ and the integration period $T_{b,i}$ are equally valid for the second detection signal as well. A suitable trade-off between the number of integration periods $n_a$, $n_b$ and the respective integration period $T_{a,i}$, $T_{b,i}$ is an important design parameter of an analyser device that employs the optical spectrometer arrangement 200, 200', 200".

If comparing to the optical spectrometer arrangement 100 that employs the single linear array detector 110 for detection over the overall range of wavelengths from $\lambda_{min}$ to $\lambda_{max}$, the optical spectrometer arrangement 200 that employs the separate linear array detector 210a and the point detector 210b allows significant further flexibility in controlling the SNR. As an example in this regard, the number of integration periods $n_a$ and the integration period $T_{a,i}$ for providing/reading the first detection signal(s) from the linear array detector 210a may be selected as a suitable compromise that enables a sufficient dynamic range for detection of each of a plurality of wavelengths of interest (e.g. $\lambda_A$, $\lambda_B$ and $\lambda_C$ in the example of FIG. 3) such that both excessive saturation and high noise level are avoided, while the number of integration periods $n_b$ and the integration period $T_{b,i}$ for providing/reading the second detection signal(s) from the point detector 210b (for detecting a single wavelength of interest, e.g. $\lambda_D$ in the example of FIG. 3) may be selected independently of $n_a$ and $T_{a,i}$: the second detection signal may be, for example, tuned for detection of very low light levels (by choosing a long integration period $T_{b,i}$) or for very high light levels (by choosing a short integration period $T_{b,i}$).

Typically, linear array detectors are operated using integration periods $T_{a,i}$ of 1-100 ms and the detection signals may be hence read out at a frequency of 10-1000 Hz. Point detectors typically enable a higher read out frequency, e.g. at 1 MHz or above, thereby enabling very short integration period $T_{b,i}$. However, in some scenarios it may be beneficial to operate the point detector at a longer integration period $T_{b,i}$ for improved SNR.

A further advantage of the optical spectrometer arrangement 200 over the optical spectrometer arrangement 100 is the possibility to separately optimize the detection performance of each of the detectors 210a, 210b with respect to a trade-off between wavelength resolution and detection sensitivity. In general, the wavelength range of a light-sensing detector element is determined by its width along the plane of dispersion, which is the plane perpendicular to the grooves of the grating. In this regard, the detector plane of the linear array detector 110, 210a is provided with an array of pixels of predefined size facing the direction of incoming light (along the first optical path). The overall design of the optical spectrometer arrangement 100, 200, 200', 200" typically aims at a resolution function of a monochromatic line spanning over 3 to 8 pixels to ensure both sufficient detection sensitivity and sufficient wavelength resolution.

In general, dedicating a high(er) number of pixels per monochromatic line enables a high(er) resolution with the cost of low(er) detection sensitivity via the overall amount of light received for a single pixel being smaller, whereas dedicating a low(er) number of pixels per monochromatic line enables high(er) sensitivity with the cost of low(er) wavelength resolution. However, in case of well-separated lines (e.g. wavelengths of interest that are relatively clearly spaced apart from each other), it is typically not necessary to aim at maximizing the wavelength resolution for the linear array detector 210a and hence the number of pixels dedicated for a single monochromatic line may be close to or even less than the lower limit of the above-mentioned range (i.e. 3 to 8 pixels), which enables improved sensitivity via receiving higher amount of light per pixel while at the same time improving stability with respect to any movement of the optical spectrometer arrangement 200 e.g. due to temperature changes.

For the point detector 210b, 210c, 210d, 210f, on the other hand, the width along the plane of dispersion may be freely selected, allowing for optimization of the sensitivity vs. the resolution for detecting light at the respective non-adjacent wavelength ($\lambda_2$, $\lambda_3$, $\lambda_4$, $\lambda_5$) independently of the resolution/sensitivity optimization applied for the linear array detector 210a.

A further advantage of the optical spectrometer arrangement 200, 200', 200" over the optical spectrometer arrangement 100 is the possibility to separately select time-resolved capabilities of the linear array detector 210a and the point detector(s) 210b, 210c, 210d and/or 210f.

In typical portable optical emission instruments, the spectra are gathered continuously during the excitation phase. The individual integrations are typically not synchronized with the individual excitation events such as laser pulses in the case of LIBS. Performing time-resolved detection whereupon the individual integrations are synchronized with the excitation events can significantly increase the sensitivity of the instrument. In particular, the integrations are typically started with a small delay after the excitation event, a process called gating, thereby rejecting the early emission of the plasma that is considered less useful for analysis. The length of delay is a key design parameter for the performance of a gating LIBS analyzer. The gating timescales available with typical array detectors such as CCD and CMOS arrays are of the order of microseconds, while those available with point detectors can reach down to nanoseconds in the case of single-photon avalanche photodiodes. The necessary gating time scales are determined by the lifetime of the plasma. The plasma lifetime is typically follows from the laser pulse energy. For example for nanosecond-length laser pulses of wavelength 1064 nm (the typical Nd:YAG laser), the plasma lifetime in metal samples is of the order of 50 ns for 50 µJ laser pulses, 5 µs for 5 mJ laser pulses, and up to tens of µs for 50 mJ laser pulses. The available laser pulse energy is typically limited in handheld instruments to below 10 mJ, and often much smaller energies of 50 µJ are used. Therefore the faster gating timescales available from point detectors may be beneficial in some cases. Using time-resolved detection with the point detector only allows adding time-resolved capabilities to the instrument for a selected important element/emission line for a low cost. Conversely, in selected applications, the linear array detector 210a can be operated in a time-resolved mode, while the point detector(s) 210b, 210c, 210d and/or 210f are operated in a continuous mode. This may be especially beneficial when time-resolved detection would result in an unacceptable low signal for a faint emission line.

Figure 6:
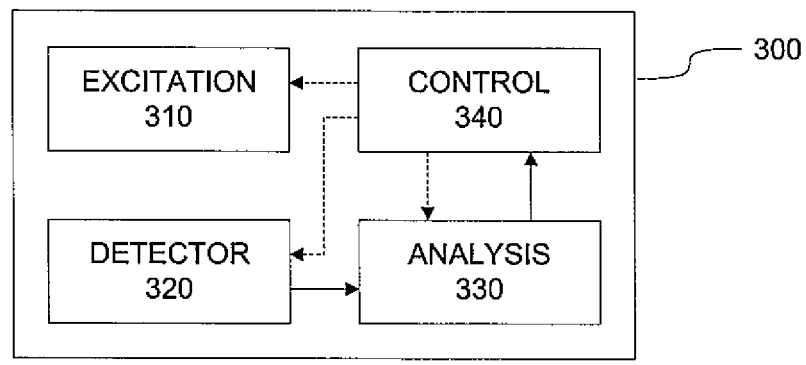
FIG. 6 schematically illustrates some components of a portable analyser according to an example embodiment.

FIG. 6 schematically illustrates some logical elements of an analyser device 300 that is useable for analysis of sample composition using the optical spectrometer arrangement 200, 200', 200". In this example, the analyser device 300 comprises an excitation means 310 for invoking an optical emission from a surface of a sample under study and a detector means 320 for observing selected wavelengths in the optical emission and for recording the first and second detection signal, wherein the detector means 320 is arranged to employ the optical spectrometer arrangement 200, 200', 200". The analyser device 300 further comprises an analysis means 330 for determination of elemental composition of the sample under study on basis of the first and second detection signals, and control means 340 for operating the excitation means 310, the detector means 320 and the analysis means 330 to carry out a spectral analysis for determination of the elemental composition of the sample under study. The control means 340 is communicatively coupled (e.g. by one or more electrical wires or electrical connectors of other type) to the excitation means 310, to the detector means 320 and to the analysis means 330 to enable control these components. In the example of FIG. 6, the dashed lines denote control signals and solid lines denote flow of (other) information. In other examples, the analysis means 330 may be, at least in part, integrated to the detector means 320 and/or to the control means 340.

The excitation means 310 may comprise a laser source that is arranged to generate a series of one or more laser pulses under control of a trigger signal issued by the control means 340. In case the excitation means 310 comprises the laser source for this purpose, the analyser device 300 may be referred to as a portable laser-induced breakdown spectroscopy (LIBS) analyzer. The trigger signal that initiates generation of the laser pulse(s) in the excitation means 310 may specify characteristics of the laser pulse(s), e.g. the number of pulses to generated, repetition rate/frequency of the pulses to be generated (if more than one pulses are to be generated) and/or power/energy of the pulse(s) and the excitation means 310 may control the laser source accordingly. Moreover, the trigger signal may further specify characteristics such as duration of the pulse(s), wavelength(s) to be applied in the pulse(s), bandwidth of the pulse(s) and the excitation means 310 may include mechanism(s) for adjusting the pulses accordingly.

Instead of the trigger signal indicating characteristics of the series of one or more laser pulses to be generated, some or all of the pulse generation characteristics applied by the laser source of the excitation means 310 may be predefined. As an example, the trigger signal may cause the laser source to generate a series including a predefined number of pulses at a predefined energy/power using a predefined bandwidth and wavelengths, where the pulses have predefined duration at a predefined repetition rate.

Instead of relying on a laser-based excitation that involves usage of the laser source for generation of laser pulses, the excitation means 310 may apply an excitation source of other type known in the art. Non-limiting examples in this regard include spark-based or arc-based excitation techniques known in the art of optical emission spectroscopy, glow discharge, inductively coupled plasma atomic emission spectroscopy (ICP-AES), microwave-assisted excitation in combination with one of the spark-based excitation, arc-based excitation and laser-based excitation.

The control means 340 is arranged to operate the excitation means 310, the detector means 320 and the analysis means 330 to carry out the spectral analysis in response to an initiation signal. The initiation signal may be received e.g. in response to the user operating the trigger means of the analyser device 300.

In particular, the spectral analysis involves the control means 340 operating the excitation means 310 and the detector means 320 to record a plurality of first and second detection signals, each detection signal representing light captured with the detection means 320 using the optical spectrometer arrangement 200, 200', 200" described via a plurality of examples in the foregoing.

Figure 7:
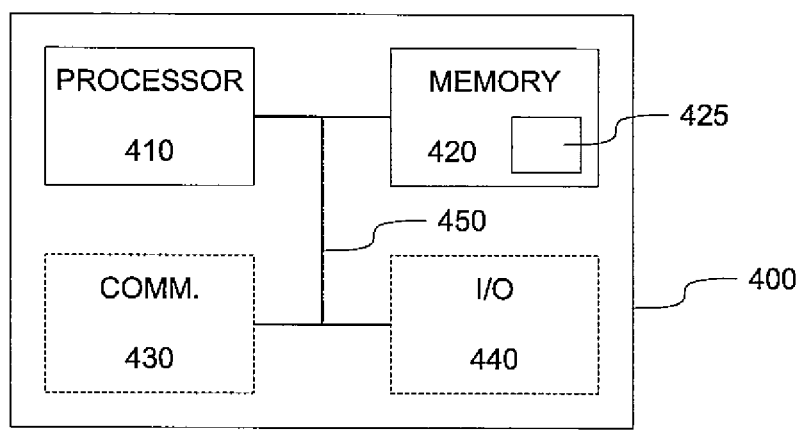
FIG. 7 depicts an apparatus according to an example embodiment.

Each of the analysis means 330 and the control means 340 may be provided by a respective hardware means, by a respective software means or by a respective combination of a hardware means and a software means. As an example in this regard, FIG. 7 schematically depicts some components of an apparatus 400 that may be employed to implement one or more of the analysis means 330 and the control means 340. The apparatus 400 comprises a processor 410 and a memory 420. The memory 420 may store data and computer program code 425. The apparatus 400 may further comprise communication means 430 for wired or wireless communication with other apparatuses and/or user I/O (input/output) components 440 that may be arranged, together with the processor 410 and a portion of the computer program code 425, to provide the user interface for receiving input from a user of the analyser device 300, and/or providing output to the user of the analyser device 300. In particular, the user I/O components may include the user input means and/or the user output means referred to in the foregoing. The components of the apparatus 400 are communicatively coupled to each other via a bus 450 that enables transfer of data and control information between the components.

The memory 420 and a portion of the computer program code 425 stored therein may be further arranged, with the processor 410, to provide the control means 340. The processor 410 is configured to read from and write to the memory 420. Although the processor 410 is depicted as a respective single component, it may be implemented as respective one or more separate processing components. Similarly, although the memory 420 is depicted as a respective single component, it may be implemented as respective one or more separate components, some or all of which may be integrated/removable and/or may provide permanent/semi-permanent/dynamic/cached storage.

The computer program code 425 may comprise computer-executable instructions that implement functions of the analysis means 330 and/or the control means 340 when loaded into the processor 410. As an example, the computer program code 425 may include a computer program consisting of one or more sequences of one or more instructions. The processor 410 is able to load and execute the computer program by reading the one or more sequences of one or more instructions included therein from the memory 420. The one or more sequences of one or more instructions may be configured to, when executed by the processor 410, cause the apparatus 400 to operate as the analysis means 330 and/or the control means 340 e.g. according to operations, procedures and/or functions described in the foregoing. Hence, the apparatus 400 may comprise at least one processor 410 and at least one memory 420 including the computer program code 425 for one or more programs, the at least one memory 420 and the computer program code 425 configured to, with the at least one processor 410, cause the apparatus 400 to operate as the analysis means 330 and/or the control means 340 e.g. in accordance with operations, procedures and/or functions described in the foregoing.

The computer program code 425 may be provided e.g. a computer program product comprising at least one computer-readable non-transitory medium having the computer program code 425 stored thereon, which computer program code 425, when executed by the processor 410 causes the apparatus 400 to operate as the analysis means 330 and/or the control means 340 e.g. according to operations, procedures and/or functions described in the foregoing. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. An optical spectrometer comprising:
    an entrance slit, the entrance slit admitting light to the optical spectrometer, the light having a first portion in a predefined range of wavelengths and a second portion having a predefined wavelength outside of the predefined range of wavelengths of the first portion;
    a combination of a collimating optical element, a wavelength-separating optical element, and a focusing optical element,
        wherein the collimating optical element receives the first and second portions of light from the entrance slit and directs the first and second portions of light in a collimated beam to the wavelength-separating optical element;
        wherein the wavelength-separating optical element receives the collimated beam from the collimating optical element, separates the first and second portions of light in the collimated beam into components of individual wavelength, and directs the components to the focusing optical element, the components from the first portion of light being sent in a first optical path and the component from the second portion of light being sent in a second optical path; and
        wherein the focusing optical element receives the components of individual wavelength from the first and second portions of light and continues the components of individual wavelength along the first optical path and the second optical path;
    a linear array detector for receiving the first portion of the light; and
    a point detector, the point detector being separate from and not a part of the linear array detector, for receiving the second portion of the light,
    wherein the first optical path leads the first portion of the light to the linear array detector, and the second optical path leads the second portion of the light to the point detector.

2. The optical spectrometer according to claim 1, wherein the wavelength-separating optical element is a diffraction grating and is arranged with respect to the collimating optical element and the focusing optical element to forward diffract light at said predefined range of wavelengths from the wavelength-separating optical element towards the focusing optical element, the first optical path thereby guiding incoming light at said pre-defined range of wavelengths to the linear array detector via the collimating optical element, the wavelength-separating optical element and the focusing optical element, and to forward diffract light at said predefined wavelength from the wavelength-separating optical element towards the focusing optical element, the second optical path thereby guiding incoming light at said pre-defined wavelength to the point detector via the collimating optical element, the wavelength-separating optical element and the focusing optical element.

3. The optical spectrometer according to claim 1, further comprising a slit or mask in the second optical path in front of the point detector for improved wavelength resolution.

4. The optical spectrometer according to claim 1, further comprising an order-sorting filter in the second optical path in front of the point detector for avoidance of interference resulting from higher diffraction orders of light at wavelengths lower than the predefined wavelength.

5. The optical spectrometer according to claim 1, configured to provide one of the following:
    a symmetrical Czerny-Turner spectrometer,
    a crossed Czerny-Turner spectrometer,
    a transmission grating spectrometer, and
    a flat-field grating spectrometer.

6. The optical spectrometer according to claim 1, wherein the linear array detector comprises a solid state sensor.

7. The optical spectrometer according to claim 6, wherein the solid state sensor comprises one of the following: a charge-coupled device, and a complementary metal-oxide-semiconductor (CMOS) sensor.

8. The optical spectrometer according to claim 1, wherein the point detector comprises one of the following:
    a photodiode,
    a photomultiplier tube,
    an avalanche photodiode, and
    a single-photon avalanche diode.

9. The optical spectrometer according to claim 1, wherein:
    a first detection signal from the linear array detector is recorded over a first collection period comprising a first predefined number of integration periods of a first predefined duration; and
    a second detection signal from the point detector is recorded over a second collection period comprising a second predefined number of integration periods of a second predefined duration,
    wherein the first predefined number is different from the second predefined number and/or the first predefined duration is different from the second predefined duration.

10. The optical spectrometer according to claim 1, wherein the linear array detector has a detection sensitivity different from a detection sensitivity of the point detector.

11. The optical spectrometer according to claim 1, wherein the linear array detector has a wavelength resolution different from a wavelength resolution of the point detector.

12. The optical spectrometer according to claim 1, wherein the collimating optical element is one of a collimating mirror and a collimating lens.

13. The optical spectrometer according to claim 1, wherein the wavelength-separating optical element is one of a diffraction grating and a dispersive prism.

14. The optical spectrometer according to claim 1, wherein the focusing optical element is one of a focusing mirror and a focusing lens.

15. An optical spectrometer comprising:
- an entrance slit, the entrance slit admitting light to the optical spectrometer, the light having a first portion in a predefined range of wavelengths and a second portion having a predefined wavelength outside of the predefined range of wavelengths of the first portion;
- a combination of a collimating optical element, a diffraction grating, and a focusing optical element,
  - wherein the collimating optical element receives the first and second portions of light from the entrance slit and directs the first and second portions of light in a collimated beam to the diffraction grating;
  - wherein the diffraction grating receives the collimated beam from the collimating optical element, separates the first and second portions of light in the collimated beam into components of individual wavelength, forward diffracts the components of the first portion of light toward the focusing optical element in a first optical path, and back diffracts the second portion of light toward the collimating optical element in a second optical path; and
  - wherein the focusing optical element receives and directs the components of individual wavelength from the first portion of light along the first optical path and the collimating optical element receives and directs the second portion of light along the second optical path;
- a linear array detector for receiving the first portion of the light; and
- a point detector, the point detector being separate from and not a part of the linear array detector, for receiving the second portion of the light,
- wherein the first optical path leads the first portion of the light to the linear array detector, and the second optical path leads the second portion of the light to the point detector.

* * * * *